(12) United States Patent
Oltman et al.

(10) Patent No.: US 8,559,812 B2
(45) Date of Patent: Oct. 15, 2013

(54) METHODS AND SYSTEMS FOR THE HIERARCHICAL MESH RESTORATION OF CONNECTIONS IN AN AUTOMATICALLY SWITCHED OPTICAL NETWORK

(75) Inventors: John Oltman, Chamblee, GA (US); Matthew W. Connolly, Canton, GA (US); Jon Carroll, Alpharetta, GA (US)

(73) Assignee: Ciena Corporation, Hanover, MD (US)

( * ) Notice: Subject to any disclaimer, the term of this patent is extended or adjusted under 35 U.S.C. 154(b) by 953 days.

(21) Appl. No.: 12/202,689

(22) Filed: Sep. 2, 2008

(65) Prior Publication Data

US 2010/0054731 A1   Mar. 4, 2010

(51) Int. Cl.
*G02F 1/00* (2006.01)
(52) U.S. Cl.
USPC .................................... 398/5; 398/1; 398/2
(58) Field of Classification Search
None
See application file for complete search history.

(56) References Cited

U.S. PATENT DOCUMENTS

| 6,377,543 | B1* | 4/2002 | Grover et al. ............... 370/227 |
| 7,391,720 | B1* | 6/2008 | Kuditipudi et al. ............ 398/1 |
| 7,477,843 | B1* | 1/2009 | Peeters et al. ............... 398/57 |
| 2003/0206516 | A1* | 11/2003 | Chen et al. ................. 370/227 |
| 2004/0105459 | A1* | 6/2004 | Mannam .................... 370/465 |
| 2004/0190441 | A1* | 9/2004 | Alfakih et al. .............. 370/216 |

* cited by examiner

*Primary Examiner* — Armando Rodriguez
*Assistant Examiner* — Sean Hagan
(74) *Attorney, Agent, or Firm* — Clements Bernard PLLC; Christopher L. Bernard; Lawrence A. Baratta, Jr.

(57) ABSTRACT

The present disclosure describes methods and systems for the hierarchical mesh restoration of connections in an ASON or the like. These methods and systems provide a mesh restorable OTN server layer that carries an aggregate of mesh restorable SONET/SDH SNCs, without designating SONET/SDH/OTN hand-off ports or work/protect lines. Server layer SNCs are terminated on Virtual Trail Termination Points (VT-TPs) on the NEs. These VTTPs maintain all of the attributes of physical Trail Termination Points (TTPs). The server routing protocol creates physical TTP interfaces at the server layer, and the server layer advertises bandwidth to the client layer routing protocol. A failure in the server layer results in the mesh restoration of an aggregate line, holding off the release of the individual client SNCs. Only when the server layer cannot restore are these individual client SNCs released.

17 Claims, 16 Drawing Sheets

METHODS AND SYSTEMS FOR THE HIERARCHICAL MESH RESTORATION OF CONNECTIONS IN AN AUTOMATICALLY SWITCHED OPTICAL NETWORK

FIELD OF THE INVENTION

The present invention relates generally to the optical networking field. More specifically, the present invention relates to methods and systems for the hierarchical mesh restoration of connections in an Automatically Switched Optical Network (ASON) or the like.

BACKGROUND OF THE INVENTION

An ASON is a network that enables the automatic delivery of transport services, including leased-line connections and other transport services, such as switched and soft-permanent optical connections. The ASON provides a framework for protection switching and reutilization is articulated by Generalized Multi-Protocol Label Switching (GMPLS) or the like. In an ASON, each network node is equipped with a control plane that sets up and releases connections, and may restore a connection in the case of a failure. These control planes may be thought of as switches. ITU-T Recommendation G.8080, "Architecture for the automatically switched optical network (ASON)," describes the set of control plane components that are used to manipulate the transport network resources, including the setting up, maintaining, and releasing of connections. A switched connection is set up and released from a Network Management System (NMS) that uses network generated signaling and routing protocols to establish the connection. Connections in an ASON are typically Synchronous Optical Network/Synchronous Digital Hierarchy (SONET/SDH) or Optical Transport Network (OTN). The architectures for these connections are described in ITU-T Recommendations G.803 and G.872, respectively.

Referring to FIG. 1, in an ASON 10, a connection may originally be requested from either a client device 12a,12b (in which case the connection is referred to as a Switched Connection (SC) 14) or a NMS interface 16 (in which case the connection is referred to as a Soft-Permanent Connection (SPC) 18). In this exemplary embodiment, the ASON 10 includes three control domains: Domain A 20, Domain B 22, and Domain C 24, and six Network Elements (NEs) 30,32, 34,36,38,40. The requesting entity may be part of any control domain 20,22,24 or part of an external network.

Domain A 20 includes NEs 30,32 as Border Nodes (BNs), Domain B 22 includes NEs 34,36 as BNs, and Domain C 24 includes NEs 38,40 as BNs. Each of these control domains 20,22,24 may include additional NEs between the BNs (not illustrated), and these are referred to as Intermediate Nodes (INs). In this exemplary embodiment, the clients 12a,12b connect to the NEs 30,40, respectively, via an Optical User-to-Network Interface (O-UNI). This enables control plane interoperability between the clients 12a,12b and the control domains 20,22,24. The control domains 20,22,24 interconnect via External Network-to-Network Interfaces (E-NNIs)—between NEs 32 and 34 for the interconnection of Domain A 20 and Domain B 22, and between NEs 36 and 38 for the interconnection of Domain B 22 and Domain C 24.

Sub-Network Connections (SNCs) 42,44,46 originate from one BN of a network (i.e. control domains 20,22,24) and terminate on another BN of the same network (i.e. control domains 20,22,24). In FIG. 1, SNC 42 originates from NE 30 and terminates on NE 32, SNC 44 originates from NE 34 and terminates on NE 36, and SNC 46 originates from NE 38 and terminates on NE 40. The links between NEs 32 and 34, and 36 and 38 are E-NNI links. The end NEs 30,40 across the control domains 20,22,24 may be SC clients that originate and terminate the SC 14. Typically, the SC 14 or SPC 18 includes multiple SNCs 42,44,46. The connections 14,18 may also include SONET/SDH services or Ethernet resources.

With the increase in demand for data traffic, ASONs are rapidly growing in size and total bandwidth, reaching hundreds of nodes. This increase in size and total bandwidth results in a large volume of messages being handled by the control planes. Processing power must increase and/or the efficiency of routing algorithms must improve if network restoration performance is to be maintained. Being finite, processing power and the efficiency of routing algorithms represent a real limitation on the scalability of a mesh network. This scalability problem may easily be imagined for lines that carry multiple SNCs in a large network. The failure of such a line requires the re-routing of all SNCs.

To solve this problem, mesh restoration may be combined with conventional line based protection at the server or line layer. Server layer protection is typically applied on the SONET/SDH line, or Optical Transport Unit/Optical Data Unit (OTUk/ODUk) path if the optical transport layer is used. Combining mesh restoration with conventional lines based protection increases performance and scalability, but requires significant network planning and introduces topology limitations. All of these line based methods require predetermined protection bandwidth and are topology dependent (i.e. ring based or point-to-point).

Combining SONET/SDH and OTN mesh networks is possible given the current state-of-the-art, but requires a clear demarcation and fixed hand-off between the two. This is even more undesirable than the former case, as these fixed hand-offs require additional protection.

Thus, what is needed in the art are methods and systems that provide a mesh restorable OTN server layer that carries an aggregate of mesh restorable SONET/SDH SNCs, without designating SONET/SDH/OTN hand-off ports or work/protect lines.

BRIEF SUMMARY OF THE INVENTION

In various exemplary embodiments, the present invention provides methods and systems for the hierarchical mesh restoration of connections in an ASON or the like. These methods and systems provide a mesh restorable OTN server layer that carries an aggregate of mesh restorable SONET/SDH SNCs, without designating SONET/SDH/OTN hand-off ports or work/protect lines. Server layer SNCs are terminated on Virtual Trail Termination Points (VTTPs) on the NEs. These VTTPs maintain all of the attributes of physical Trail Termination Points (TTPs). The server routing protocol creates physical TTP interfaces at the server layer, and the server layer advertises bandwidth to the client layer routing protocol. A failure in the server layer results in the mesh restoration of an aggregate line, holding off the release of the individual client SNCs. Only when the server layer cannot restore are these individual client SNCs released.

In an exemplary embodiment, a method for hierarchical mesh restorations of connections in an Automatically Switched Optical Network includes receiving a request to create a Virtual Sub Network Connection, wherein the Virtual Sub Network Connection includes a defined payload type; creating an originating Virtual Connection Point at an originating node; creating a terminating Virtual Connection Point at a terminating node; and mapping the defined payload type to the originating Virtual Connection Point and the terminating Virtual Connection Point. The method can further include creating an Optical Data Unit Trail Termination Point through an Optical Transport Network signal and routing protocol. Optionally, the method further includes auto-creating a SONET/SDH Trail Termination responsive to creating the Optical Data Unit Trail Termination Point; creating a SONET/SDH Connection Termination Point through a SONET/SDH signal and routing protocol; and creating cross connects in a switch matrix. Alternatively, the method further includes advertising available bandwidth in terms of Optical Transport Network bandwidth. The method can include responsive to a failure, mesh restoring the Virtual Sub Network Connection; and if unable to mesh restore the Virtual Sub Network Connection, performing one of standard mesh restoration and Local Span Mesh Restoration. Optionally, the method is performed by an optical switch including one or more line modules; a switch matrix interconnecting each of the one or more line modules, wherein the switch matrix is configured to switch at each of Optical Transport Network, SONET, and SDH layers; wherein the switch matrix is configured to operate responsive to an Optical Transport Network signal and routing protocol and a SONET/SDH signal and routing protocol.

In another exemplary embodiment, an optical switch includes one or more line modules, wherein the one or more line modules are configured to terminate each of Optical Transport Network, SONET, and SDH; a switch matrix interconnecting each of the one or more line modules; wherein the switch matrix is configured to operate responsive to an Optical Transport Network signal and routing protocol and a SONET/SDH signal and routing protocol; wherein the Optical Transport Network signal and routing protocol is configured to provide restoration of Optical Data Unit and Optical Channel Payload Virtual Container Sub Network Connections. The one or more line modules are configured to terminate each of Optical Transport Network, SONET, and SDH; and the switch matrix is configured to switch at each of Optical Transport Network, SONET, and SDH layers. The optical switch can further include one or more Optical Data Unit Sub Network Connections each terminated on a Virtual Trail Termination Point. Optionally, the optical switch further includes an Optical Transport Unit Trail Termination Point terminating a physical Optical Transport Network signal to an Optical Channel Data Unit signal; an Optical Data Unit Trail Termination Point terminating the Optical Channel Data Unit signal to a Synchronous Transport Module signal; and a Synchronous Transport Module Trail Termination Point terminating the Optical Channel Data Unit signal to a plurality of Administrative Units connected to a plurality of Connection Termination Points in the switch matrix. The optical switch can also include a Virtual Trail Termination Point configured to logically terminate Synchronous Transport Module and Optical Channel Data Unit trails. The Optical Transport Network signal and routing protocol is configured to create the Optical Data Unit Trail Termination Point and the Synchronous Transport Module Trail Termination Point; and the SONET/SDH signal and routing protocol is configured to create the Synchronous Transport Module Trail Termination Point and cross connects in the switch matrix. The restoration can include mesh restoring a plurality of Optical Transport Network Sub Network Connections between Virtual Connection Points on physical interfaces on the one or more line modules; and if unable to restore the plurality of Optical Transport Network Sub Network Connections, performing one of standard mesh restoration and Local Span Mesh Restoration.

In yet another exemplary embodiment, an Automatically Switch Optical Network includes a plurality of interconnected nodes; an Optical Transport Network signal and routing protocol communicating to each of the plurality of nodes; a SONET/SDH signal and routing protocol communicating to each of the plurality of nodes; wherein the Optical Transport Network signal and routing protocol is configured to provide restoration of Optical Data Unit and Optical Channel Payload Virtual Container Sub Network Connections. The Optical Transport Network signal and routing protocol communicates to each of the plurality of nodes through a General Communication Channel; and the SONET/SDH signal and routing protocol communicates to each of the plurality of nodes through a Data Communication Channel. The General Communication Channel advertises Optical Transport Network bandwidth and the Data Communication Channel advertises SONET/SDH bandwidth. The restoration can include mesh restoring a plurality of Optical Transport Network Sub Network Connections between Virtual Connection Points on physical interfaces; and if unable to restore the plurality of Optical Transport Network Sub Network Connections, performing one of standard mesh restoration and Local Span Mesh Restoration.

BRIEF DESCRIPTION OF THE DRAWINGS

The present invention is illustrated and described herein with reference to the various drawings, in which like reference numbers are used to denote like method steps/system components, as appropriate, and in which.

DETAILED DESCRIPTION OF THE INVENTION

The object of the present invention is to create an OTN layer that provides for the mesh restoration of ODUx and Optical Channel Payload Virtual Container (OPVCx) SNCs. The OTN layer is modeled based on the conventional SONET/SDH model. OC-192—SONET TTP is analogous to OTU2—OTN TTP and STS-1/Nc—SONET Connection Termination Point (CTP) is analogous to ODUx/OPVCx—OTN CTP. Advantageously, the Line Modules (LMs) used are capable of terminating both the OTN and SONET/SDH layers and switching at either layer. As a result, a single physical OTN interface may have both an OTN TTP and one or more SONET/SDH TTPs within it.

The network is operated as distinct layers. OTN bandwidth is advertised via the General Communication Channel (GCC) and SONET/SDH bandwidth is advertised via the Data Communication Channel (DCC), or alternatively over an out-of-band communication channel for OSRP (e.g., through an IP network). OTN bandwidth is advertised in terms of the available ODU2, ODU1, and OPVC bandwidth. An OTU2 with no connections advertises support for 1xODU2, 4xODU1, 16-64xOPVC (ORP Lite), for example. A common port group mode must be supported for these applications. Thus, a Field Programmable Gate Array (FPGA) load that supports an ODU2 cross connect must also support NxODU1 and NxOPVC. A given OTN interface may support both SONET/SDH and OTN connections, but the SONET/SDH portion of the bandwidth must be allocated by the user—the control plane itself does not determine this. An OTN SNC that carries SONET/SDH is OTN bandwidth. There is no need to define the SONET/SDH bandwidth on intermediate nodes—only at the origination/termination points.

Figure 1:
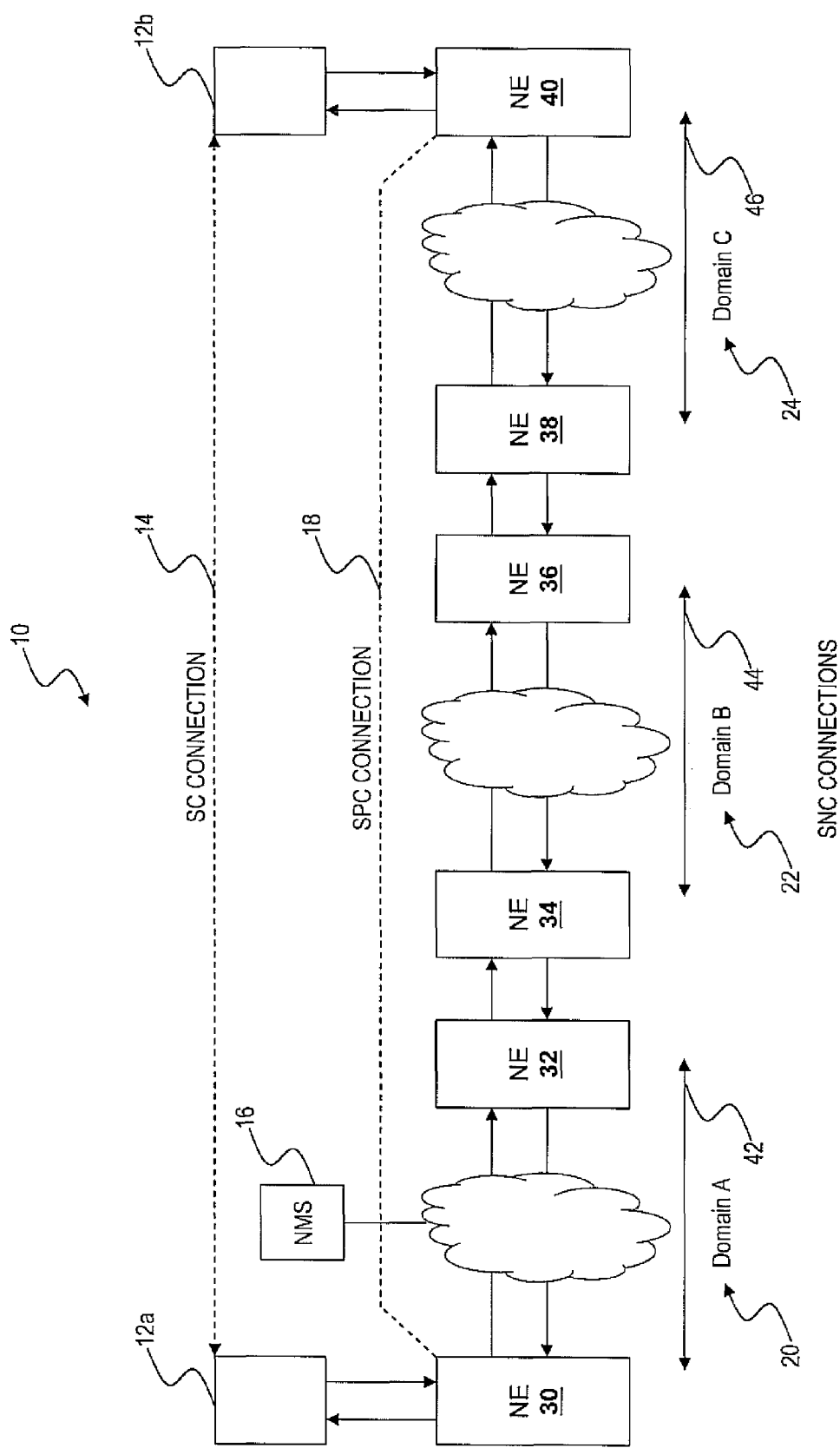
FIG. 1 is a schematic diagram illustrating a conventional ASON.
Figure 2:
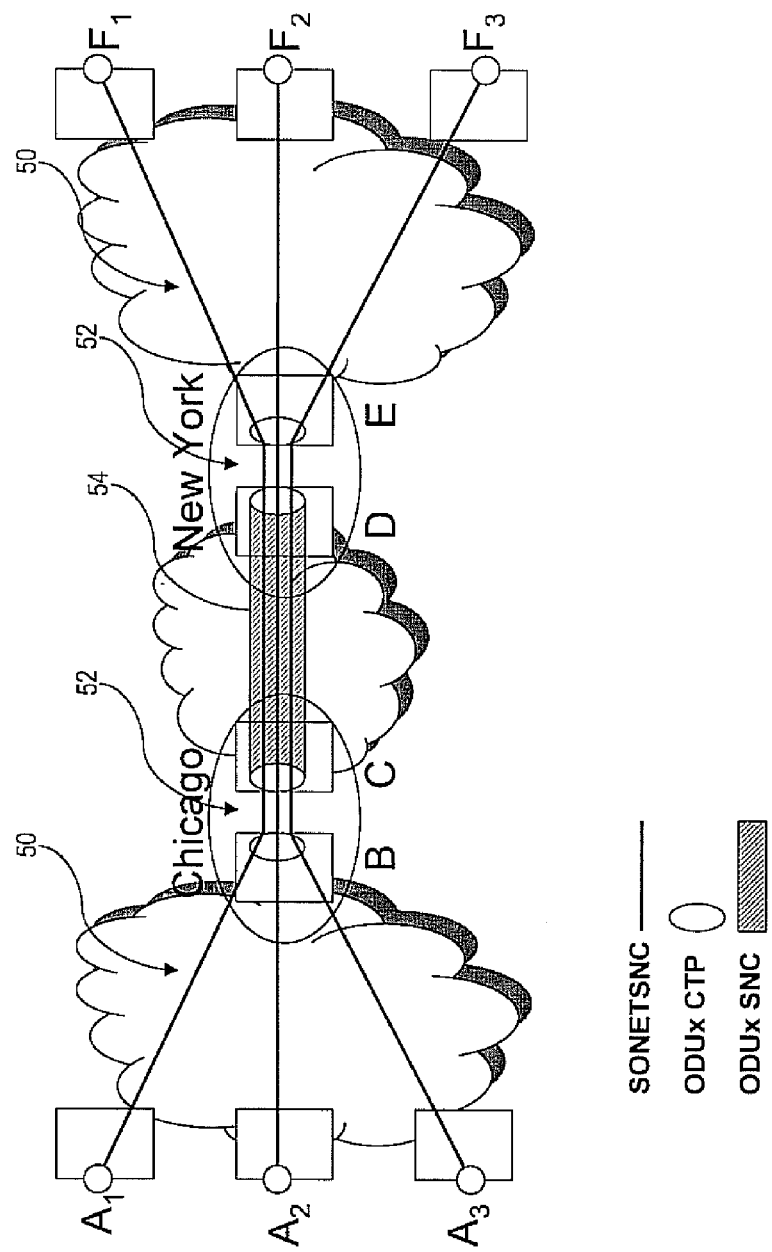
FIG. 2 is a schematic diagram illustrating a conventional method for using an OTN SNC to realize a SNC highway.

Referring to FIG. 2, an OTN SNC may be used to realize a SNC highway. A SONET line (OC-48/192) is mapped into an ODUx, and then an ODUx SNC is created. A signaling and routing protocol, such as Optical Signaling and Routing Protocol (OSRP), at the SONET level sees Chicago and New York as direct neighbors. Any size connection may utilize the bandwidth and the SNCs are provisioned on an end-to-end basis. An outage on the link results in an ODUx SNC mesh restoration. If an ODUx is unable to restore, the SONET line within it is failed and standard mesh restoration or Local Span Mesh Restoration (LSMR) is applied. In effect, the bundle is allowed to splinter and restore on any available bandwidth. A single OTU2 may be broken up into 4xODU1 and support 4xOC-48, or a single ODU2 and support an OC-192. FIG. 2 illustrates these SONET SNCs 50, ODUx CTPs 52, and this ODUx SNC 54.

Figure 3:
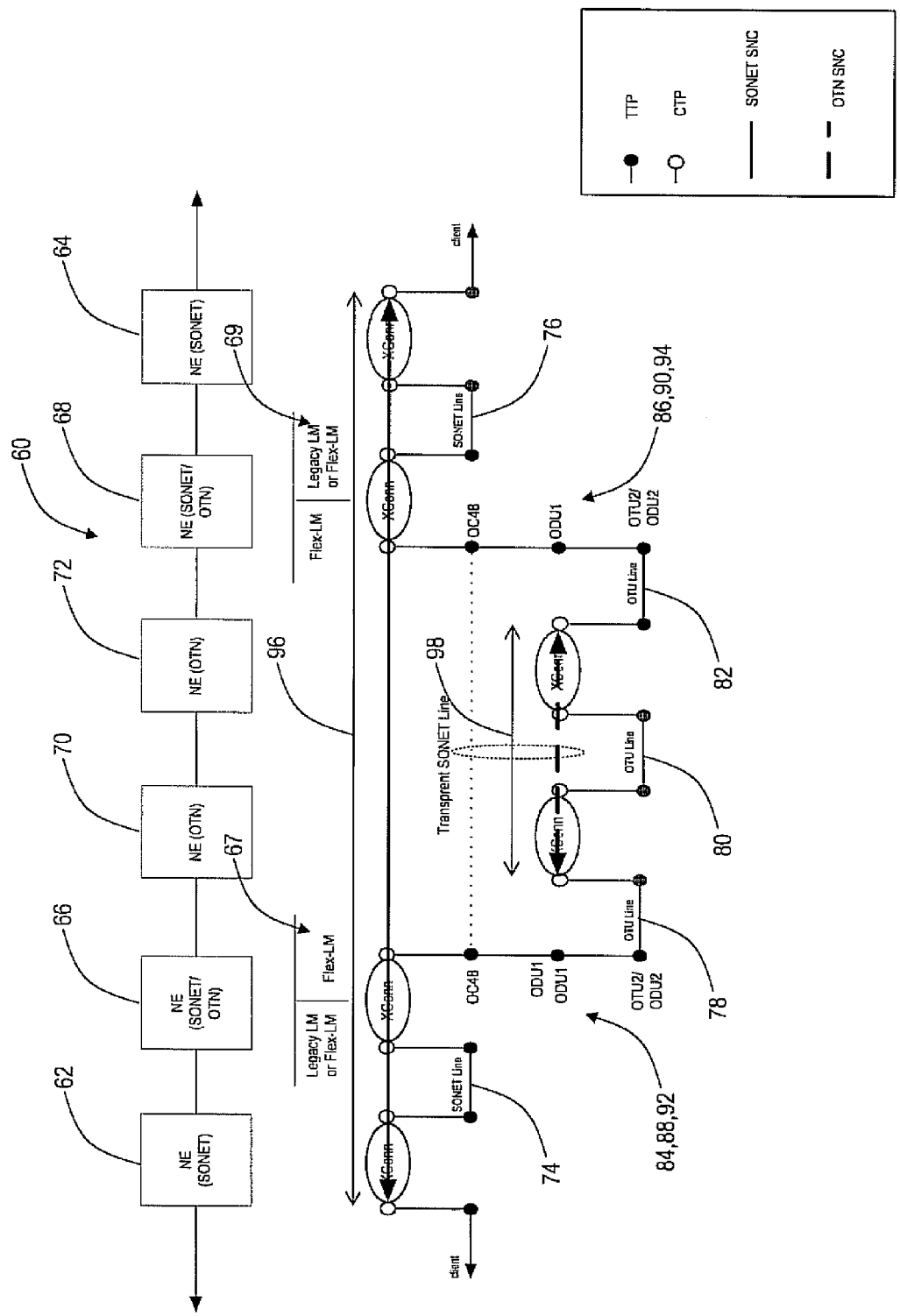
FIG. 3 is another schematic diagram (network layer model) illustrating a conventional method for using an OTN SNC to realize a SNC highway.

Referring to FIG. 3, the network layer model 60 includes multiple optical switches (SONET) 62,64, multiple optical switches (SONET/OTN) 66,68, and multiple optical switches (OTN) 70,72. Line Modules (LMs) 67,69 used at the SONET/OTN switches 66,68 are capable of terminating both the SONET and OTN layers and switching at either layer. The cross connects of the SONET switches 62,64 and SONET/OTN switches 66,68 are coupled via SONET lines 74,76, and the cross connects of the SONET/OTN switches 66,68 and OTN switches 70,72 are coupled via OTU lines 78,80,82. The various TTPs and CTPs are illustrated, including OC48 TTPs 84,86, ODU1 TTPs 88,90, and OTU2/ODU2 TTPs 92,94. The SONET SNC 96 spans the SONET-SONET/OTN-OTN-SONET/OTN-SONET realm, while the OTN SNC 98 spans the OTN realm.

Figure 4:
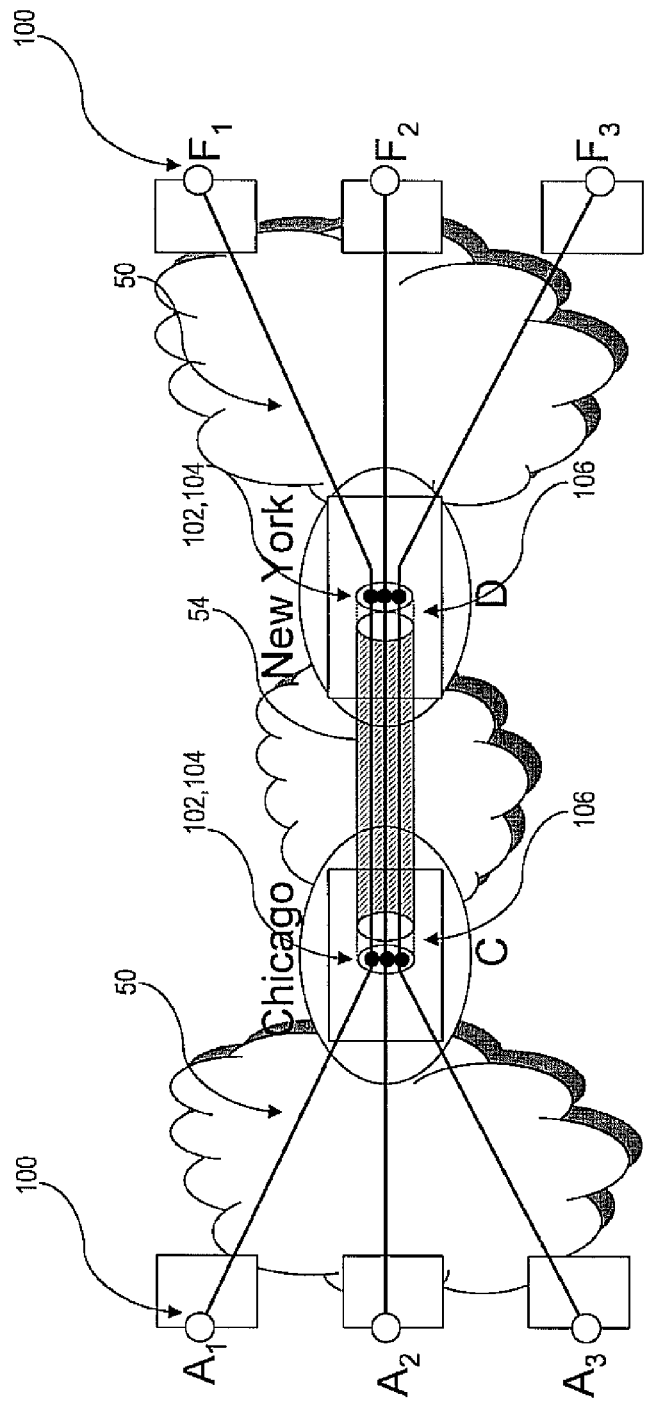
FIG. 4 is a schematic diagram illustrating one exemplary embodiment of a method for exploiting an OTN SNC using a VTTP in accordance with the present invention.

Referring to FIG. 4, in one exemplary embodiment of the present invention, an OTN SNC uses a VTTP. Advantageously, a physical hand-off is not required to start the OTN SNC, and the OTN SNC originates on a NE, not on a port. The VTTP is a compound object: (SONET client VTTP+server ODUx VTTP+ODUx VCP). The OTN SNC is then created between the ODUx VCPs at the origination and terminating nodes. Since the ODUx VCP is created in the fabric, an OTN SNC that originates on it may mesh restore to any physical interface. The SONET VTTP is remapped to a new physical interface as the OTN SNC is created or mesh restored. FIG. 4 illustrates these SONET SNCs 50, this ODUx SNC 54, these SONET CTPs 100, SONET VCPs 102, SONET VTTPs 104, and ODUx VTP with SONET VTPs 106. Note, the ODU_CTP and VCP do not need to be exposed to the management system.

Figure 5:
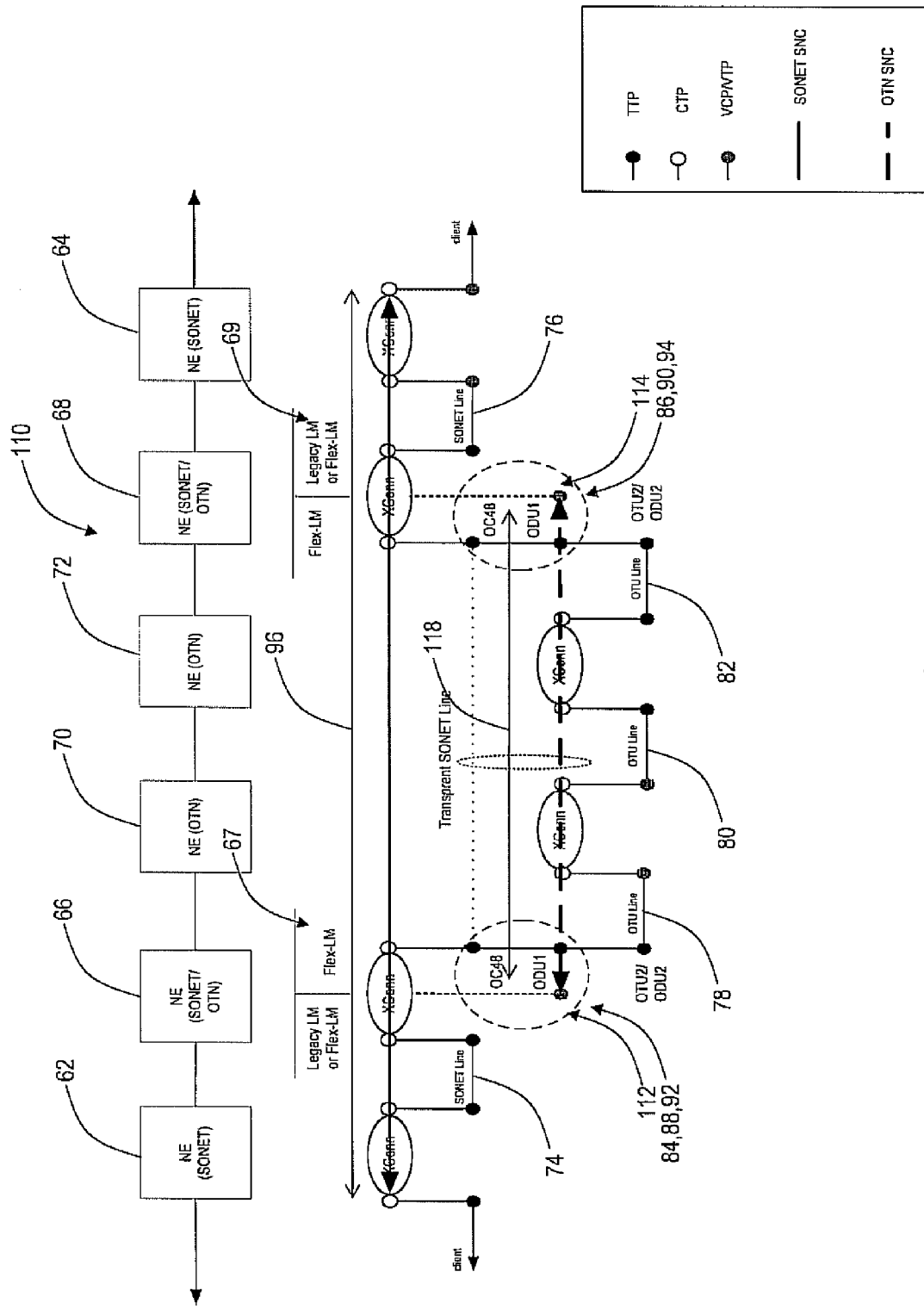
FIG. 5 is another schematic diagram (network layer model) illustrating one exemplary embodiment of a method for exploiting an OTN SNC using a VTTP in accordance with the present invention.

Referring to FIG. 5, the network layer model 110 again includes multiple optical switches (SONET) 62,64, multiple optical switches (SONET/OTN) 66,68, and multiple optical switches (OTN) 70,72. The LMs 67,69 used at the SONET/OTN switches 66,68 are capable of terminating both the SONET and OTN layers, i.e. capable of terminating SONET lines, OTUk section, and ODUk/OPVCx paths, and switching at either layer. The cross connects of the SONET switches 62,64 and SONET/OTN switches 66,68 are coupled via SONET lines 74,76, and the cross connects of the SONET/OTN switches 66,68 and OTN switches 70,72 are coupled via OTU lines 78,80,82. The various TTPs and CTPs are illustrated, including OC48 TTPs 84,86, ODU1 TTPs 88,90, and OTU2/ODU2 TTPs 92,94. The VCP/VTPs 112,114 described above are also illustrated. The SONET SNC 96 spans the SONET-SONET/OTN-OTN-SONET/OTN-SONET realm, while The OTN SNC 118 spans the SONET/OTN-OTN-SONET/OTN realm.

Figure 6:
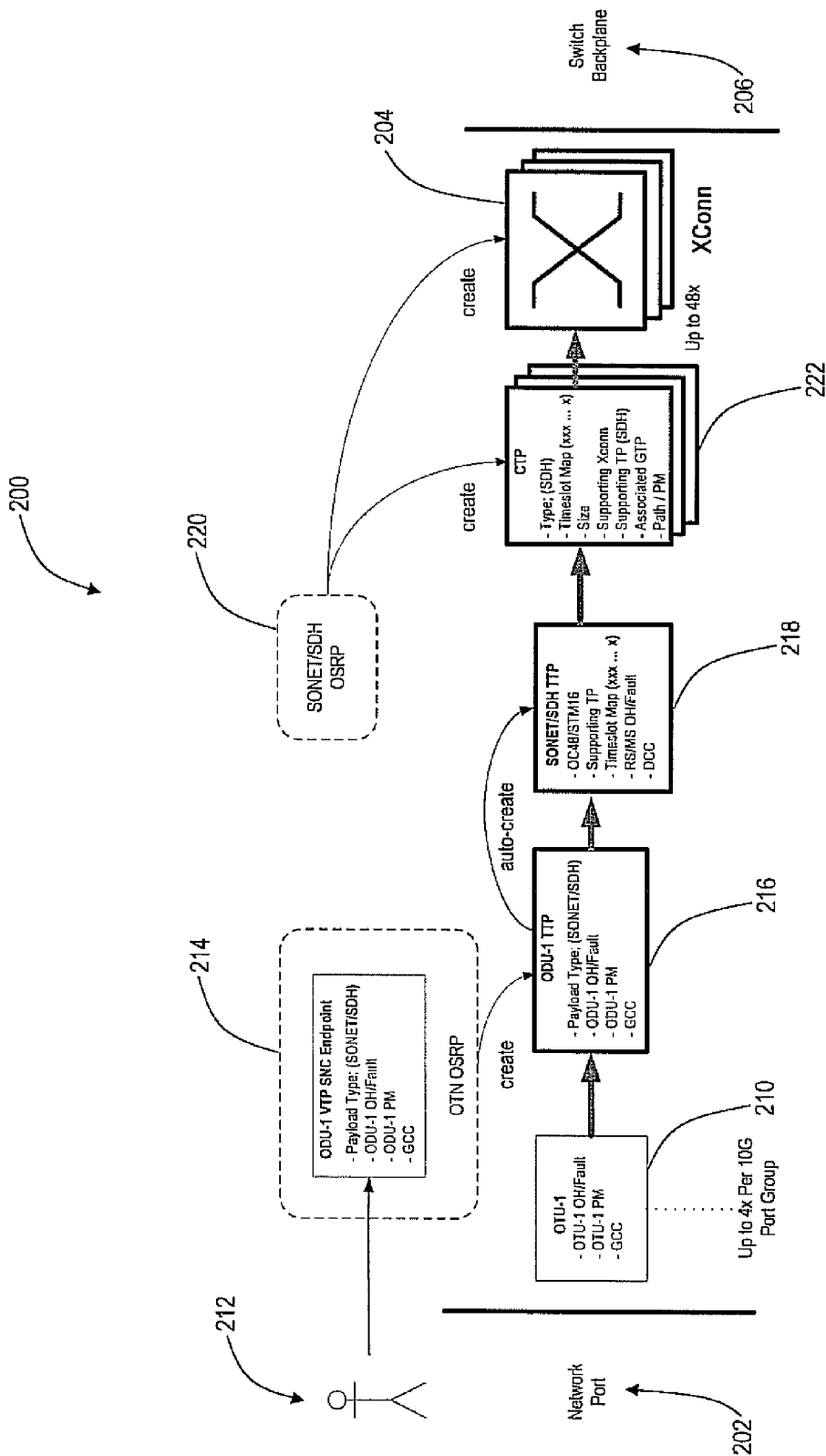
FIG. 6 is a schematic diagram of a provisioning view of VTP SNC (VSNC) termination in an optical switch in accordance with the present invention.

Referring to FIG. 6, a provisioning view 200 of VTP SNC (VSNC) termination in an optical switch is illustrated according to an exemplary embodiment of the present invention. The optical switch includes network ports 202 (e.g., OC-48/STM-16, OC-192/STM-64, OTU2, OTU3, etc.), a switch matrix 204, and a switch backplane 206 (e.g., electrical, optical, etc.). The switch backplane 206 is configured to physically connect each of the network ports 202 and the switch matrix 204, and the switch matrix 204 is configured to provide cross connection between various connections of the network ports 202 including the setting up, maintaining, and releasing of connections. The provisioning view 200 is illustrated with regard to OTU1s, and those of ordinary skill in the art will recognize that OTU2, OTU3, etc. are also contemplated by the present invention.

The optical switch is configured to receive OTU1 210 traffic from one or more or the network ports 202, i.e. up to four OTU1s per 10 G port group. Each OTU1 210 has associated overhead data including, for example, OTU1 overhead fault information, performance monitoring data, GCC, and the like. A network administrator/operator 212 can define an ODU-1 VTP SNC endpoint 214 with, for example, a payload type (SONET/SDH), OTU1 overhead fault information, performance monitoring data, GCC, and the like. Accordingly, a compound VTTP is created which includes all three components (ODU VCP+ODUVTTP+SONETVTTP). Those three things are connected in "lock-step" together, but strictly speaking, the ODU-1 SNC would terminate on the ODU-1VCP. In the present invention, the ODU-1VCP is always attached to the child VTTP, so it is not necessary to expose the ODU VCP in the management interface.

Responsive to defining the ODU-1 VTP SNC endpoint 214, a switch and routing protocol, such as OSRP, can create an ODU1 TTP 216 with a defined payload type, OTU1 overhead fault information, performance monitoring data, GCC, and the like. Next, a SONET/SDH TTP 218 is auto-created responsive to the ODU1 TTP 216 with a defined payload type (e.g., OC-48/STM-16, etc.), a supporting Termination Point (TP), a timeslot map, overhead information, DCC information, and the like.

A SONET/SDH signaling and routing protocol 220, such as OSRP, creates a SONET/SDH CTP 222 with a defined type, timeslot map, size, supporting cross-connect information, supporting TP information, associated GTP, overhead information, and the like. Also, the signaling and routing protocol 220 creates the SONET/SDH CTP in the switch matrix 204.

Accordingly, the OSRP can auto-create OTN TTPs within the switch matrix 204 since it has to size larger interfaces to smaller sizes on the fly. This effort overcomes the slow user interfaces that are used today. This works to create the correct LM setup as well in addition to the switch matrix 204. Once created, the new OTN TTPs 216 work as normal TTPs do today with connectable timeslots. Also, the switch matrix 204 is still fast since this is still a matter of moving pointers around. The provisioning view 200 illustrates an exemplary operation of creating OTN TTPs in accordance with the present invention.

The STMn/ODU VTTP represents the logical STMn/ODU line. The STMn TP maintains all the STMn line attributes, including capacity (timeslot usage), operational state, etc. The resources (timeslots in this case) are advertised at the SONET/SDH layer ORP, a pointer is provided to the physical STMn/ODU TTP currently supporting the VCx_CTP→VCx_VCP cross-connect. The STMn timeslot resources are freely advertised to the SONET/SDH layer and participate in SONET/SDH OSRP just like any other regular line.

If the physical OTUk line goes down, the ODU SNC is released back to the VTTP, deleting the ODU_CTP→ODU_VCP cross-connect. The OTN OSRP routing protocol will then attempt to find another operational OTUk line to build a new physical STMn/ODU TTP and re-establish a new ODU_CTP→ODU_VCP cross-connect. Once the new physical TTP is constructed, VCP pointers are updated and the VCx_CTP→VCx_VCP cross-connect is maintained for the transiting SONET/SDH SNCs.

The line state for the STMn logical line is still up during the OTN re-route, so SONET SNCs using it will not release or perform LSMR unless the OTN layer was unable to restore, in which case the STMn logical line state would go down. A timer may be implemented here.

Figure 7:
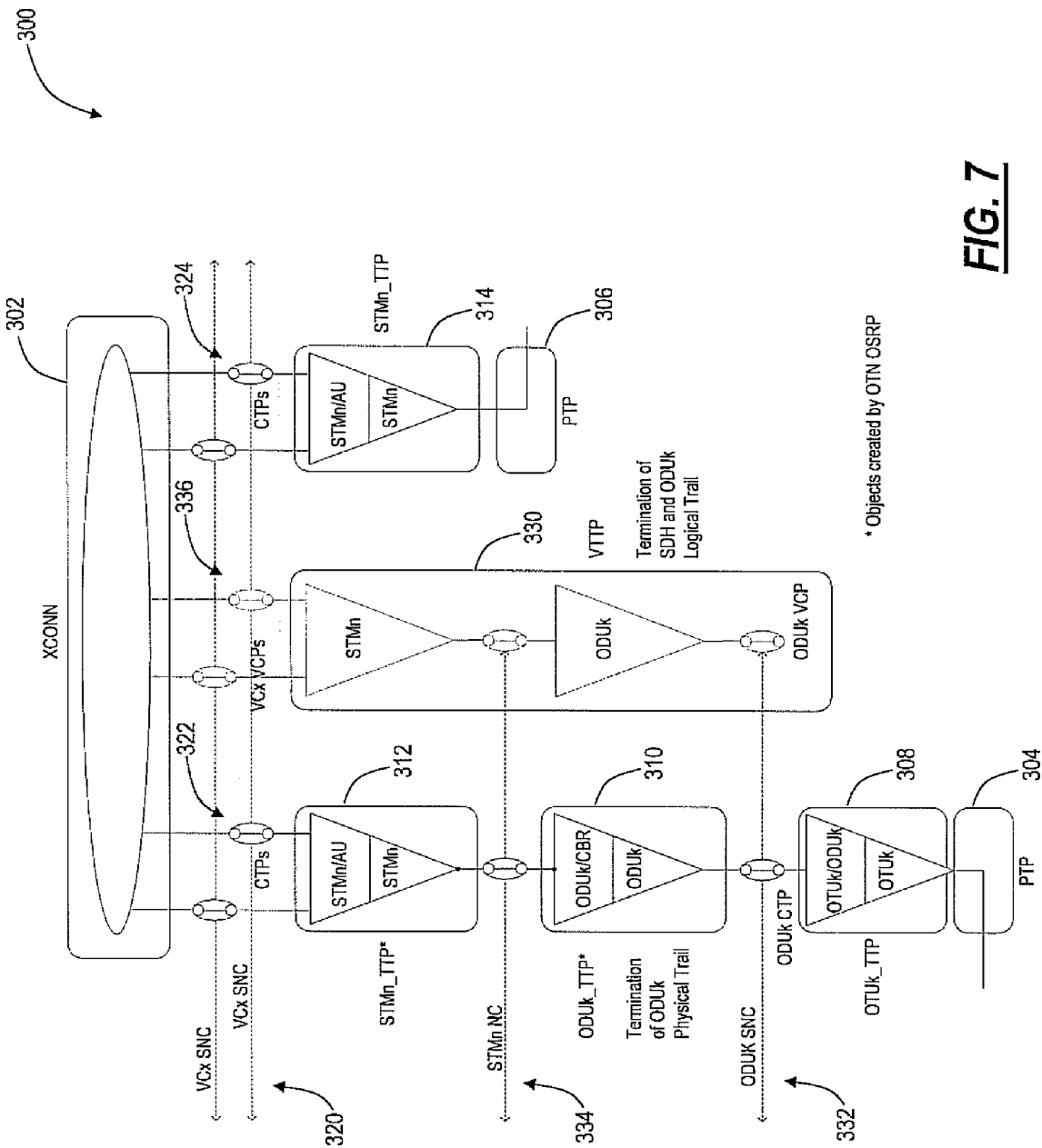
FIG. 7 is schematic diagram of various objects created in a switch matrix in accordance with the present invention.

Referring to FIG. 7, a functional view 300 illustrates various objects created in a switch matrix 302 in accordance with the present invention. The functional view 300 utilizes topology components described in ITU-T Recommendation G.805, "Generic functional architecture of transport networks." The functional view 300 illustrates physical connections (Point-to-Point, PTP) 304,306 with the connection 304 including an OTN connection and the connection 306 including a Synchronous Transport Module (STM) (SDH) connection.

The OTN connection 304 is physically terminated first on a OTUk TTP 308 from an OTUk to an ODUk. Next, the connection 304 is physically terminated on an ODUk TTP 310 from an ODUk to a Constant Bit Rate (CBR) signal. The CBR signal is an STM which is terminated on an STMn TTP 312 to an Administrative Unit (AU). The STM connection 306 is physically terminated on an STMn TTP 314 to an AU. Various VCx SNCs 320 are cross-connected through CTPs 322, 324, but are terminated elsewhere in the SONET/SDH network.

As described herein, the present invention includes a VTTP 330 to provide termination of logical SDH and ODUk trails. The VTTP 330 provides a termination of an ODUk SNC 332 and an STMn NC (network connection) 334. For example, the ODUk SNC 332 can terminate on an ODU2 VTTO with a CBR payload type. The ODUk SNC 332 and the STMn NC 334 are accordingly terminated at Virtual Connection Points (VCPs) 336. Note, the ODUk SNC 332 and the STMn NC 334 are always routed together.

In the present invention, an OTN signal and routing protocol, such as OSRP, is configured to create the ODUk TTP 310 and the STMn TTPs 312,314 on the line side of a terminating node. The parameters for these TTPs 310,312,314 are maintained by the VTTP 330. A SONET/SDH signal and routing protocol is configured to create CTPs 322,324 and cross-connects with the switch matrix 302.

Figure 8:
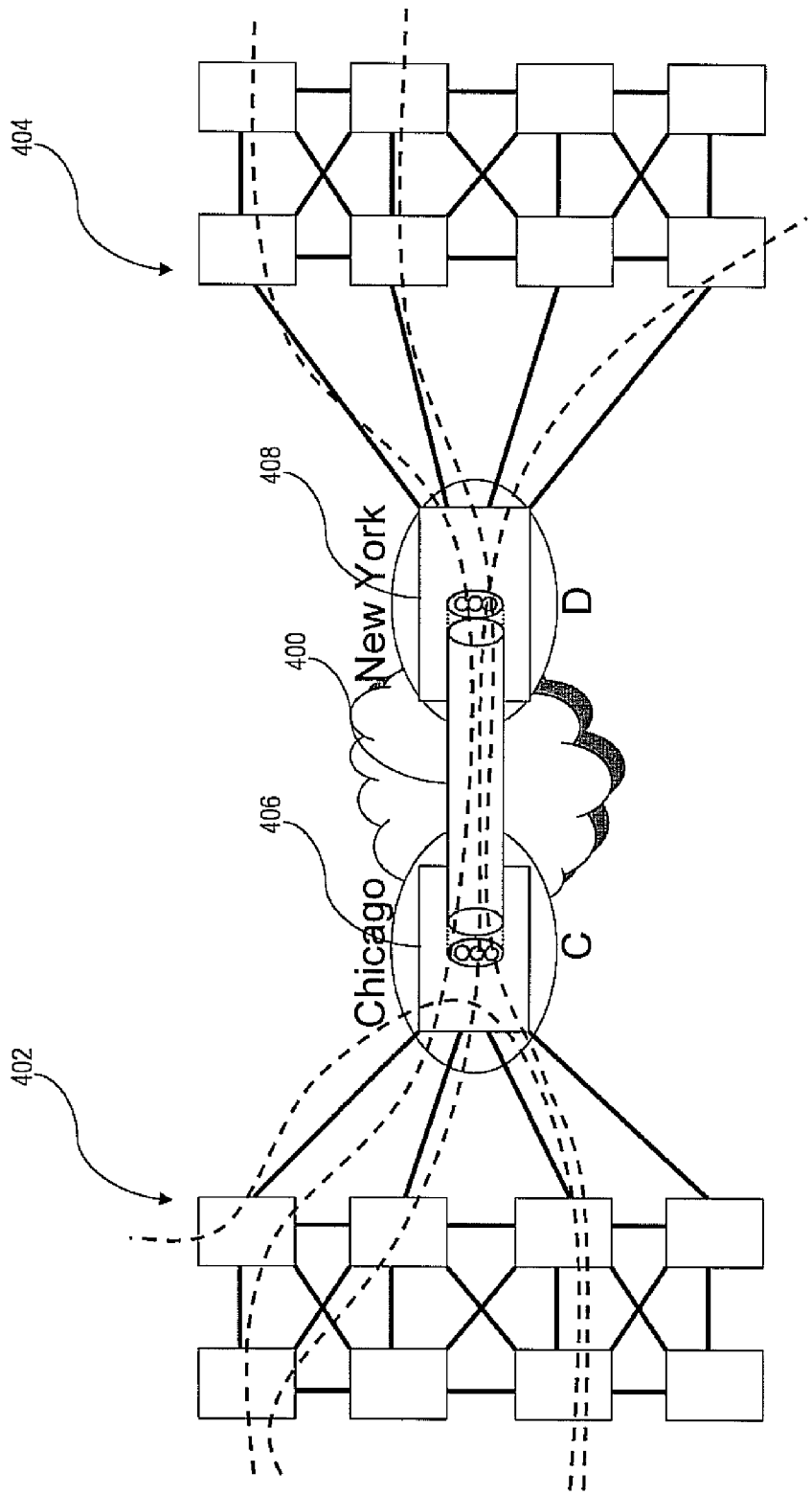
FIG. 8 is a schematic diagram illustrating example connections that are supported by the VTTP methods and systems of the present invention.

Referring to FIG. 8, a single ODU SNC 400 may be created to support connections from all adjacent nodes 402,404. The connections from these adjacent nodes are not bound to the highway, and the SNCs may switch to any available output on the nodes 406,408.

The present invention enables switching at the line level not the individual connection. This provides a new construct of a "VTTP Highway". This represents a virtual TTP connection that goes between two nodes (but could transverse many nodes to get there), e.g. nodes 406,408. From a signal and routing protocol's connection perspective, it appears that it is a normal TTP that goes to another "adjacent" node. The key is that it is not bound to a physical line. It is a logical representation like traditional line protection. Therefore the physical line can be changed without the application (connection OSRP, for example) knowing or having to react at the connection level. The switching of the "VTTP Highway" is really switching of the ODUk path using OSRP, and the SONET line comes along for the ride. So the adjacency is with respect to SONET across the OTN network.

With regard to failures, the VTTP version of the signal and routing protocol determine an alternate "OTN highway" of matched OTN size between the origination and destination nodes, e.g. nodes 406,408. If it cannot find one, it marks the VTTP "down" which starts the connection-based switch and routing protocol doing normal connection switching. If it can find an alternate route, it uses signaling to create OTN TTPs on these nodes within a switch core (and the LMs) as in OTN SNCs.

On the originating and terminating nodes for the VTTP highway, e.g. nodes 406,408, a "line based" switch occurs with the VTTP being switched from/to the new OTN TTPs. This is similar to Automatic Protection Switching (APS). The switch and routing protocol does not have to worry about the connections on the VTTP. It sees the entire VTTP as a connection. It simply tells the switch core to create the new OTN TTP and then switch the VTTP TLPI to the new OTN TTP TLPI. A VTTP switch and routing protocol leverages the OTN SNC routing and bandwidth management to be able to determine alternate VTTPs. For example, Designated Transit Lists (DTL's) can be available for VTTP highways since they handled like connections.

Figure 9:
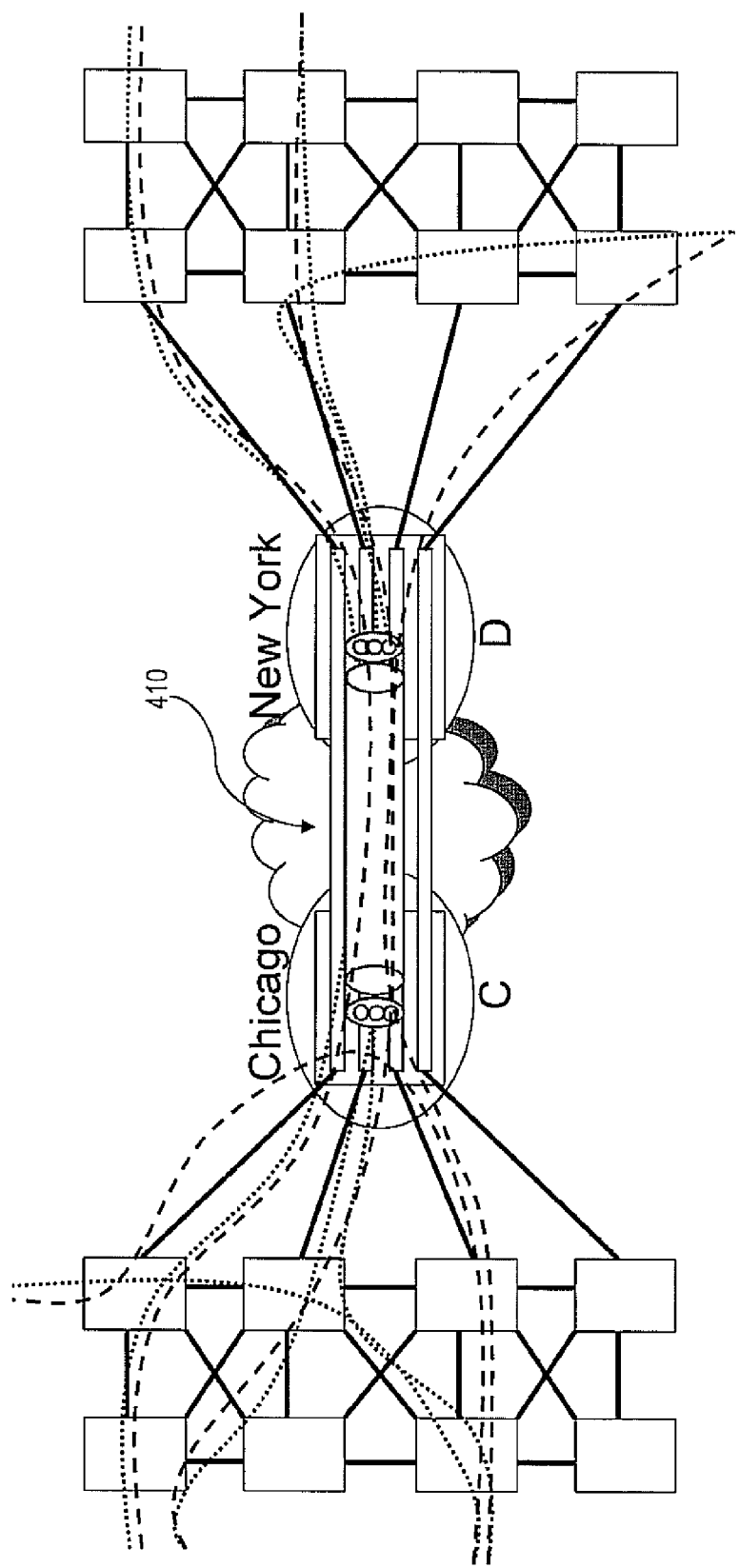
FIG. 9 is another schematic diagram illustrating example connections and how they are handled in the absence of the VTTP methods and systems of the present invention.

Referring to FIG. 9, without the VTTP, an ODU SNC 410 per interface must be created. The first SNC is unchanged. The next two SNCs must be switched to a node that supports a given highway. A SNC that does not want to ride the highway must be switched on other bandwidth.

For example, conventional mechanisms utilize a greedy algorithm for connection-based switching. Physical lines include timeslots that are grouped together. Each timeslot has a head timeslot (for concatenation) and a pointer to a potential cross-connect (in case it is in a crossconnect). At boot up, all timeslots are associated with their physical lines.

TTPs are user created and have physical timeslots moved to them. So if there is an OTU2 physical line, and an ODU2 is created, all 192 timeslots are owned by the TTP. This allows applications to cross-connect to them. Also if an ODU1 is created on timeslot 1 on the ODU2, the first 48 timeslots are moved to the new ODU1 TTP. TTPs are indexed by TxnLogicalPortIds (TLPIs) which are 32 bit numbers that indicate what type of line, in what LM slot, at which TBU starting timeslot, For line based protection switching, when an application like Virtual Line Switched Ring (VLSR) or APS wants to switch from a work line to a protect line, it tells the switch core to copy the timeslot pointers from one TTP (via its TLPI) to another and select from the new source. At this point switch core is sending to both lines but listening to traffic from the protect. This is a relatively fast operation since no new memory is created.

The signal and routing protocol, such as OSRP, can establish a suitable cross-connect to support a given SNC. For example, the following cross-connects are supported: ODU2, ODU1, and OPVC1-Xn (X=1-16). A system can support OTN SNC network side interfaces on LMs configured to support both SONET/SDH and OTN on PTPs with provisioned service type-OTUk (k=1, 2).

The OTN signal and routing protocol, e.g. an OTN OSRP, can utilize the GCC bytes in the G.709 overheard. For example, because some DWDM equipment terminates GCC0, the OTN OSRP can use GCC(1, 2) for OSRP routing and signaling. When using such equipment for DWDM transport, the GCC channel must remain active in order for the OTUk OSRP line to remain up. This includes cases where ODUk maintenance signals are present. It is therefore necessary to alter treatment of PM overhead bytes for OSRP lines using GCC(1, 2). When a communication protocol (including OSRP) is enabled on an OTUk interface using GCC1, or GCC2, or GCC(1+2), the system can read and terminate the GCC1 and/or GCC2 bytes. This requirement includes cases where the ODUk layer is cross-connected.

When communication protocol (including OSRP) is enabled on an OTUk interface using GCC1, or GCC2, or GCC(1+2), the system can generate new GCC1 and/or GCC2 bytes in the PM overhead. This requirement includes cases where the ODUk layer is cross-connected. When communication protocol (including OSRP) is enabled on GCC1, or GCC2, or GCC(1+2), the system can read and write messages in the GCC bytes, even in the presence of a maintenance signal. Maintenance signals include: ODU-AIS, ODU-OCI, and OCU-LCK. When communication protocol (including OSRP) is enabled on GCC1, or GCC2, or GCC(1+2), the system can read and write messages in the GCC bytes while inserting a maintenance signal toward the line. Maintenance signals include: ODU-AIS, ODU-OCI, and OCU-LCK. [R]

Figure 10:
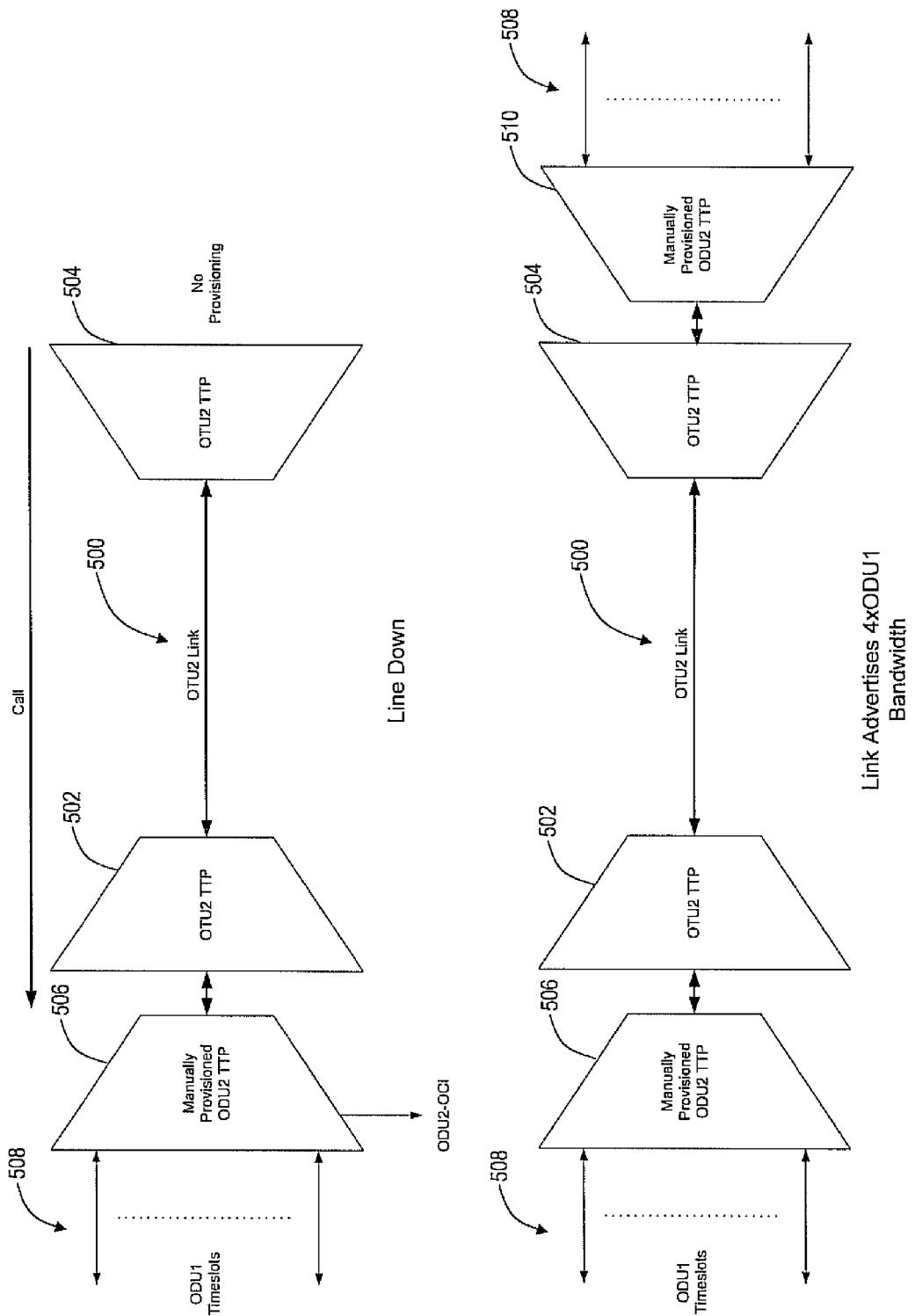
FIG. 10 is a diagram of an OTN OSRP line, such as an OTU2 Link, defined at the OTUk network layer.

Referring to FIG. 10, with respect to OTN OSRP routing, an OTN OSRP line, such as an OTU2 Link 500, is defined at the OTUk network layer. Embedded OTN TTPs, such as OTU2 TTPs 502,504, are not considered OSRP lines, although provisioning of embedded lines restricts the available bandwidth, and determines the size and type of bandwidth advertised. The OTN OSRP link 500 is defined as one or more OSRP lines. Routing on OTUk OSRP lines can be enabled or disabled. OTUk lines can advertise bandwidth (BW) on the given line according to the following rules:

| Provisioned interface scenario: | Advertised BW |
| --- | --- |
| OTU2 only | ODU2 |
| | 4 × ODU1 |
| | 16 × OPVC1 |

-continued

| Provisioned interface scenario: | Advertised BW |
| --- | --- |
| OTU2 with ODU2 TTP, PT = 20 with available ODU1 timeslots | (1-4) × ODU1 |
| | 16 × OPVC1 |
| OTU1 only | ODU1 |
| | 16 × OPVC1 |
| OTU2 with one or more ODU1 TTP, at least one empty ODU1 timeslot, one ODU1 TTP PT = 0x80 with available timeslots | (1-3) × ODU1 |
| | (1-16) × OPVC1 |
| OTU2 with 4 × ODU1 TTP, one ODU1 TTP PT = 0x80 with available timeslots | 1-16 OPVC1 |

In order to prevent inefficient use of bandwidth, the system can provide a mechanism to limit the minimum connection size on the link as described in the following table:

| Line interface | Min. Connection Size - allowed values |
| --- | --- |
| OTU1 | ODU1, OPVC1 |
| | Default = OPVC1 |
| OTU2 | ODU2, ODU1, OPVC1 |
| | Default = OPVC1 |

The system does not allow SNCs smaller than the minimum connection size to use a given link. For example, a bandwidth update is sent when the number of available ODU1 timeslots on a link changes. When the actual available bandwidth changes to ODU2, a new routing update can be generated. When the maximum available bandwidth on a link changes to NxOPVC (N=1-16), the available bandwidth advertised in any outgoing routing update is NxOPVC. Only OTUk lines can be capable of having OTN OSRP routing enabled. Embedded ODUk do not participate in routing and signaling for OTN OSRP. Note that embedded SONET/SDH lines are capable of supporting routing for SONET/SDH OSRP.

If child TTPs are embedded SONET/SDH, the system treats them as separate lines (in routing/signaling and ISCC) and routing could be enabled on those lines. Embedded SONET/SDH lines can have routing enabled or disabled. Node adjacency for OTN and SONET/SDH is specific to the traffic type. Adjacency for an OTN link is determined by OTUk TTPs, whereas SONET/SDH adjacency is determined by SONET Line or SDH MS TTPs. The system can provide a provisioning interface to enable routing over GCCn on the OTUk interface.

FIG. 10 illustrates an example of TTP in Open Connection Indication (OCI). In a first configuration, the system advertises the OSRP line as down for lines that have one or more manually created TTPs (i.e., ODU2 TTP 506 with a plurality of ODU1 timeslots 508) in OCI alarm. This applies to cases where a termination point is provisioned at one end of the link, but not the other. In a second configuration, the systems advertises 4xODU1 bandwidth on the OTU2 link when both sides include ODU2 TTPs 506,510 with the plurality of ODU1 timeslots 508.

Figure 11:
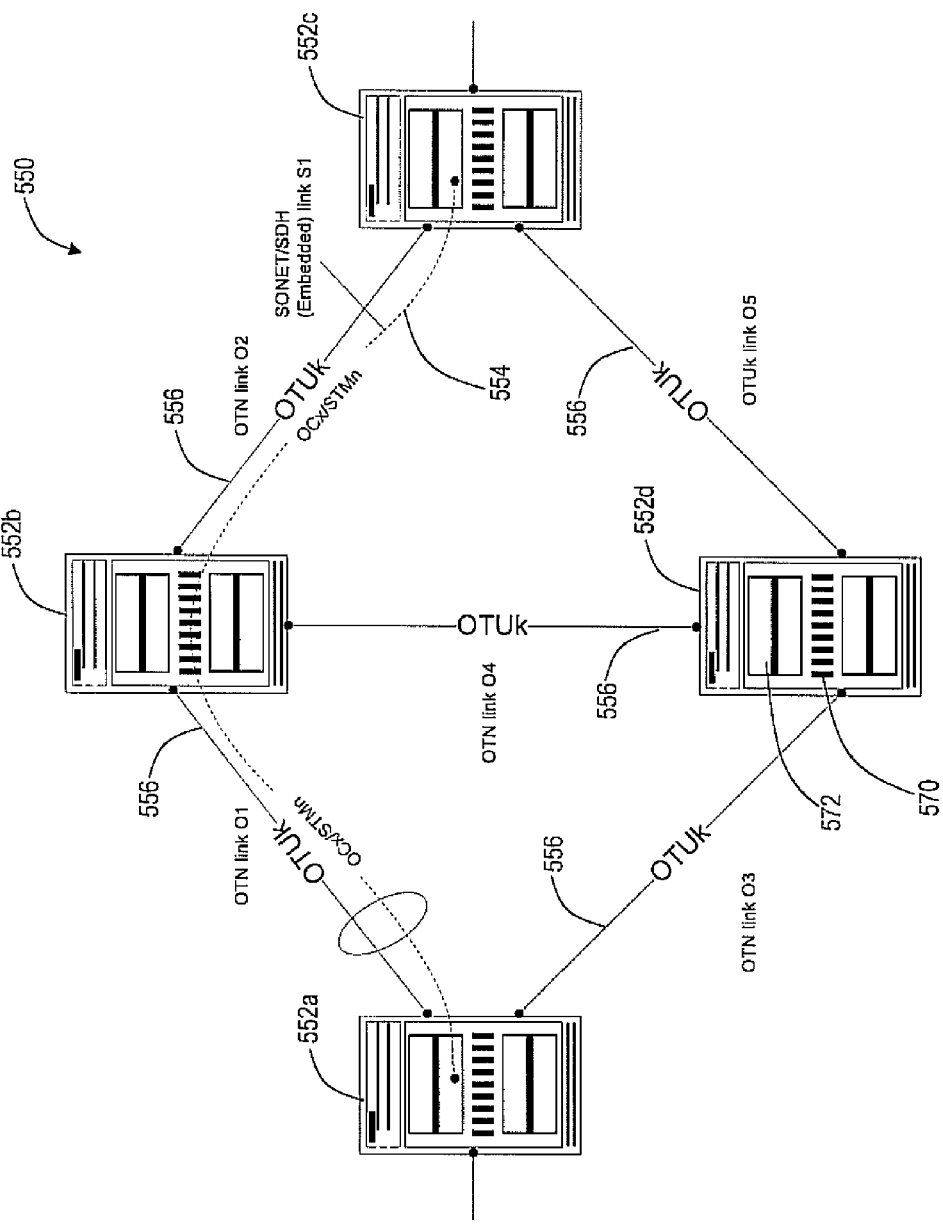
FIG. 11 is a network diagram of a network of optical cross connects (OCXs) illustrating an example of embedded SONET/SDH links with OTN links.
Figure 13:
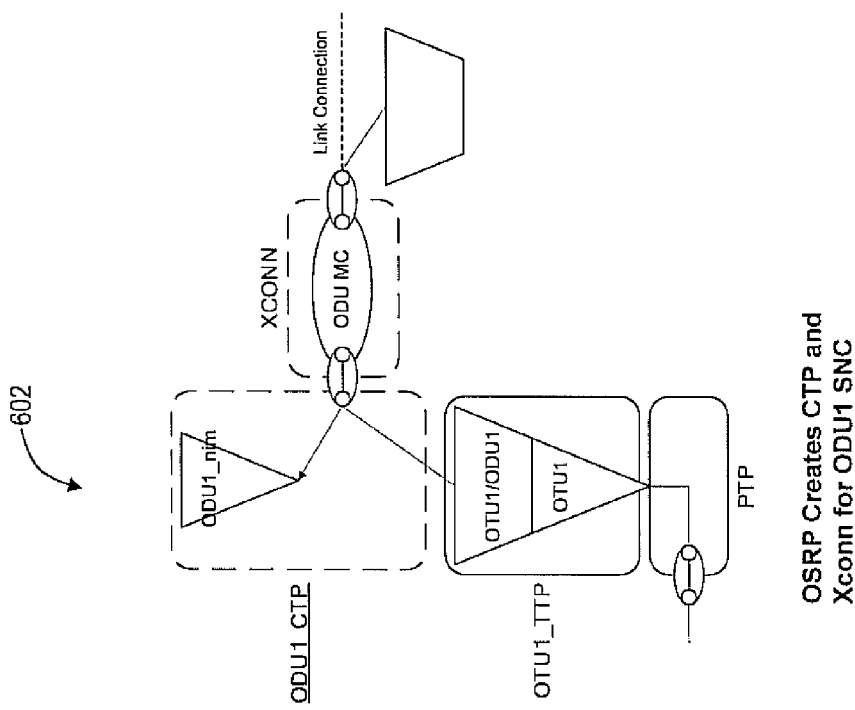
FIGS. 12—19 are diagrams illustrating various exemplary embodiments of OTN OSRP object creation and deletion.
Figure 12:
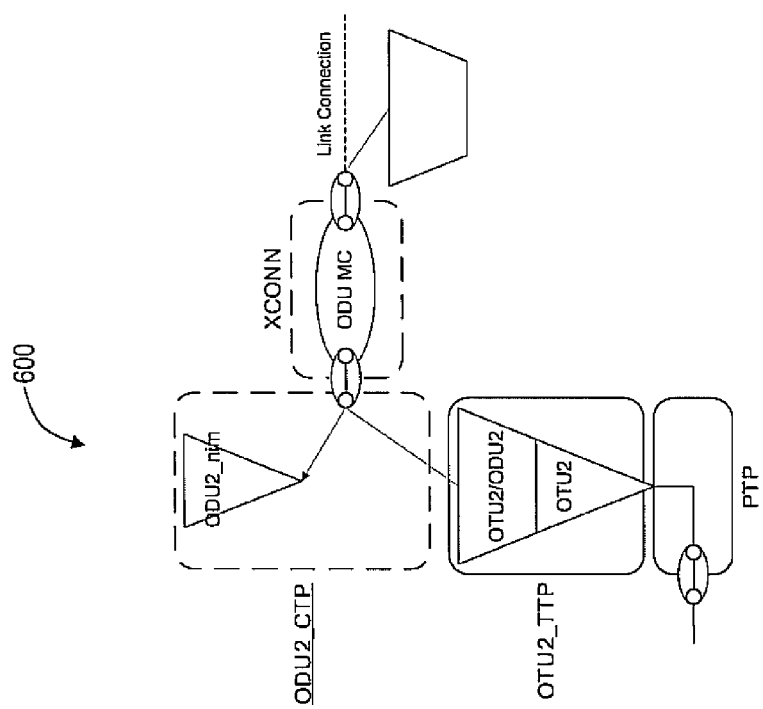
Figure 15:
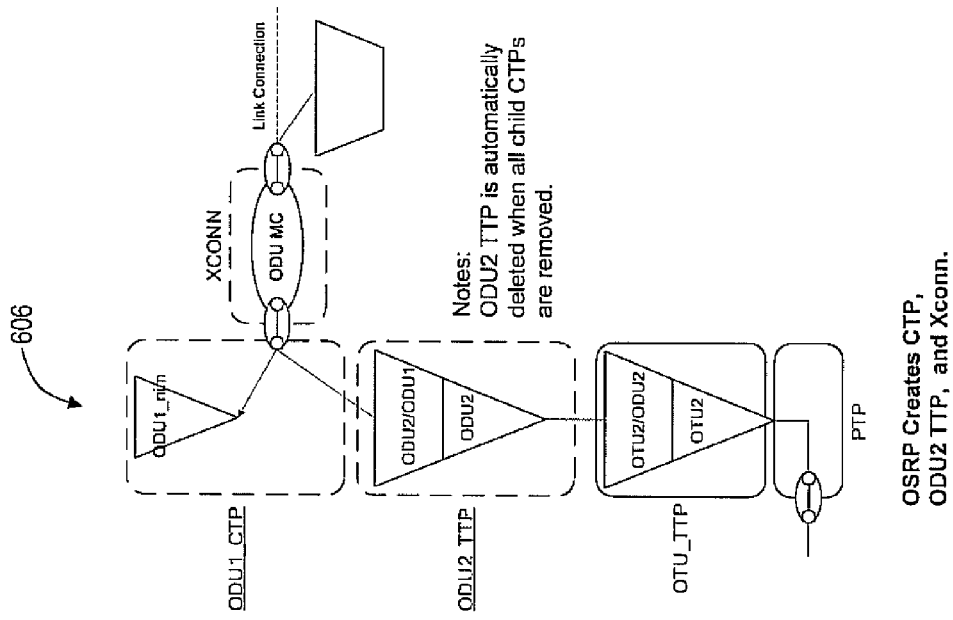
Figure 14:
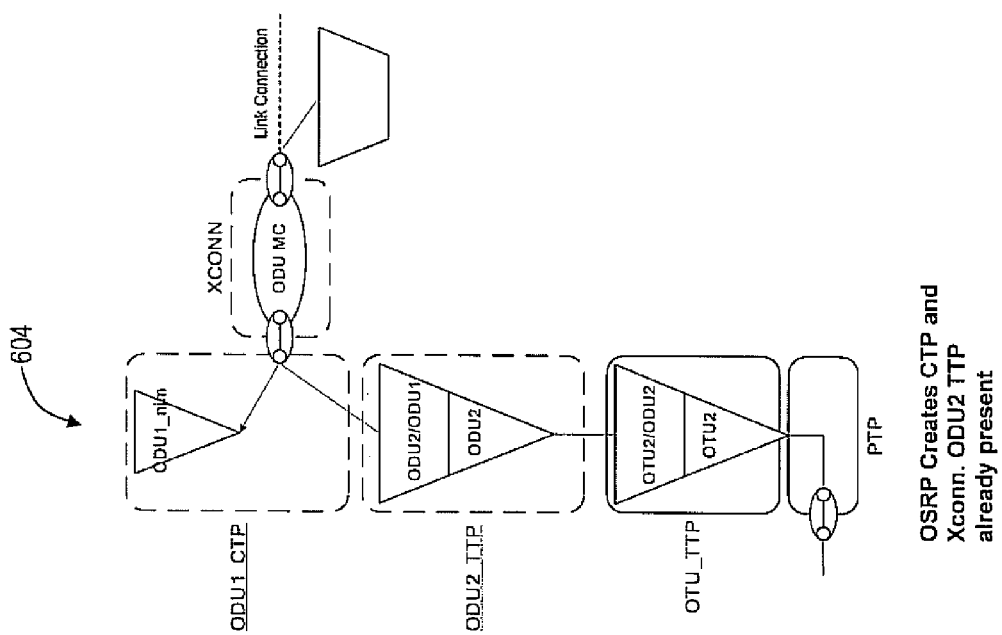
Figure 16:
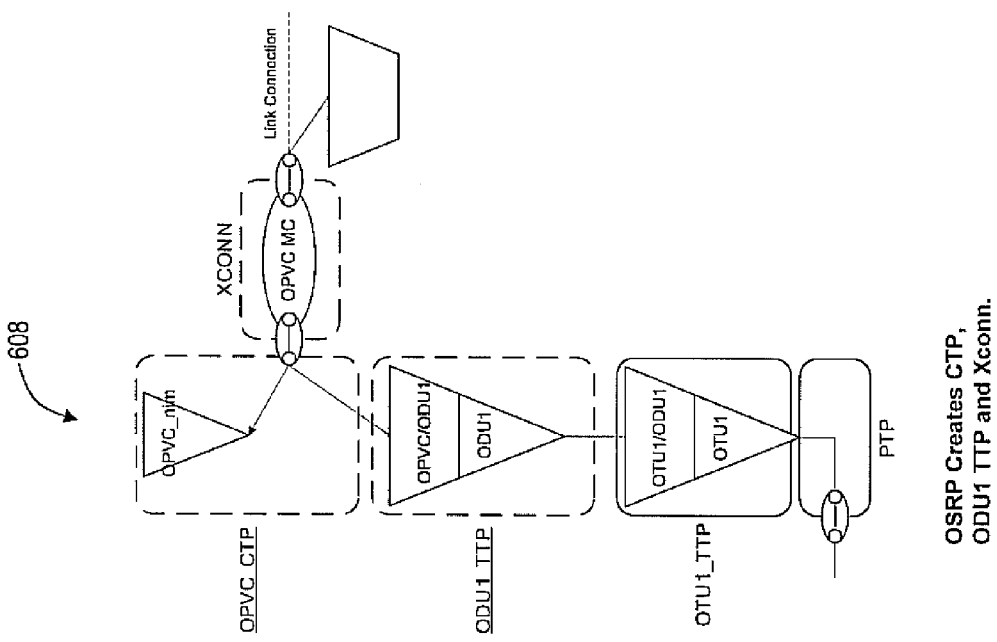
Figure 17:
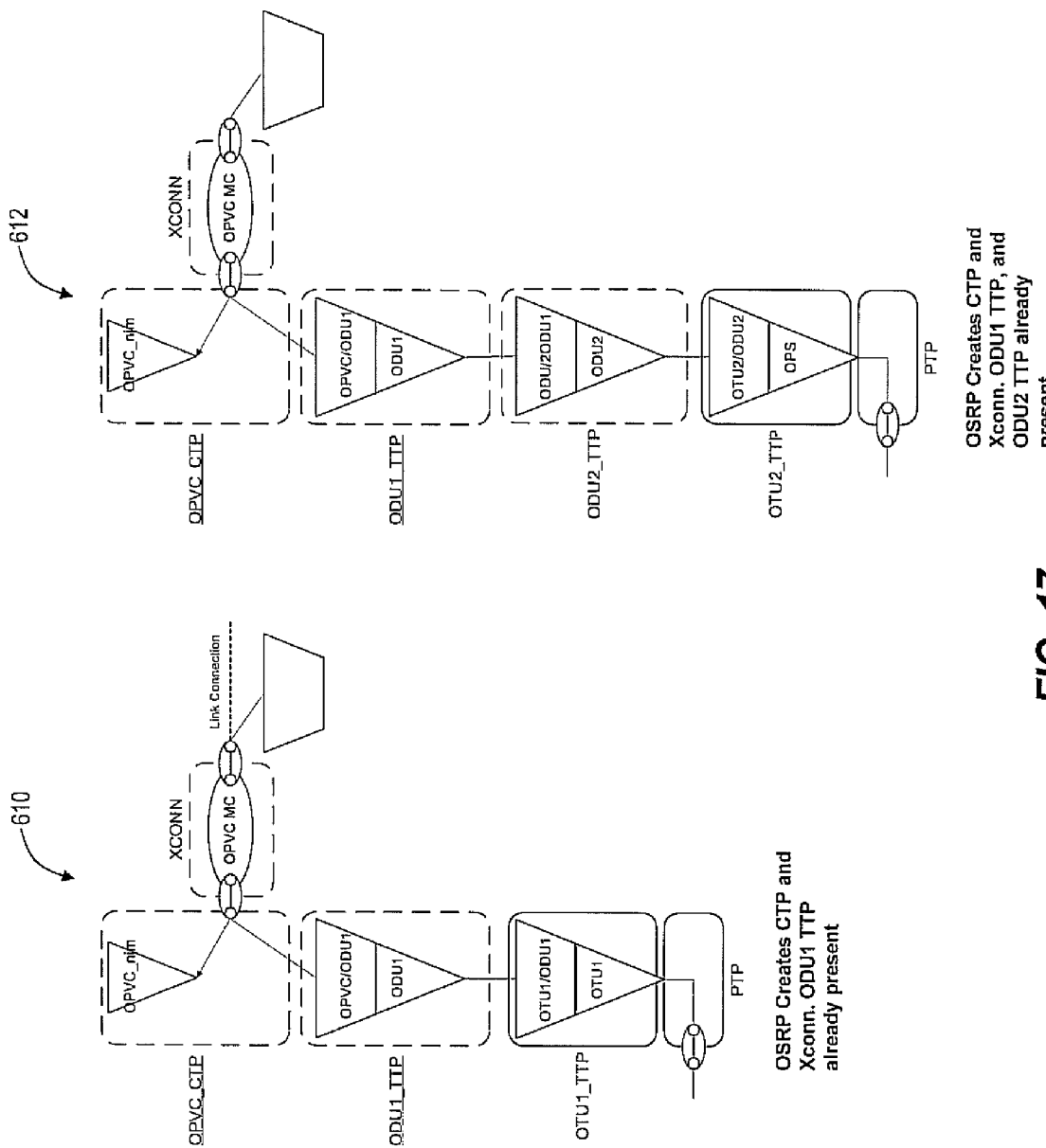
Figure 19:
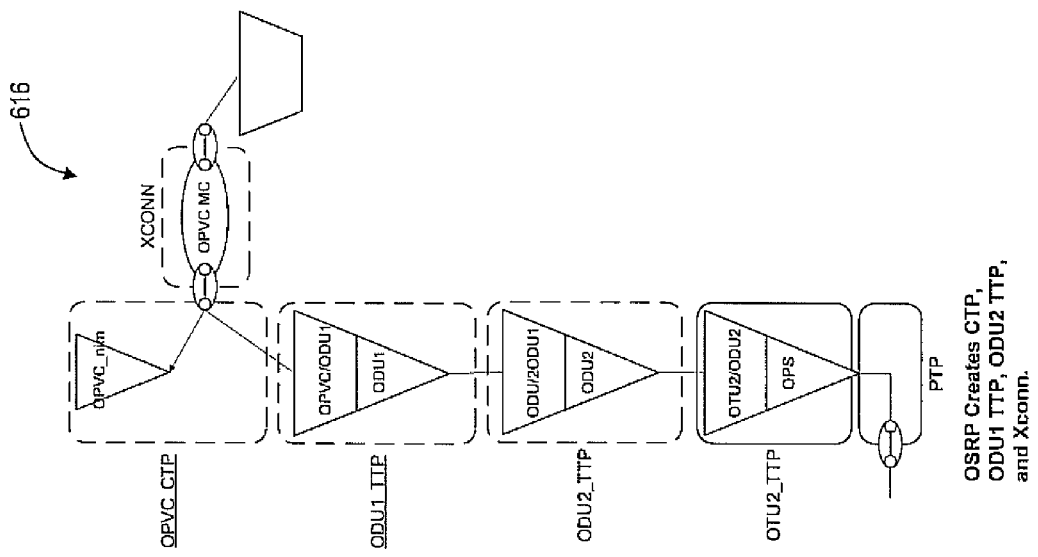
Figure 18:
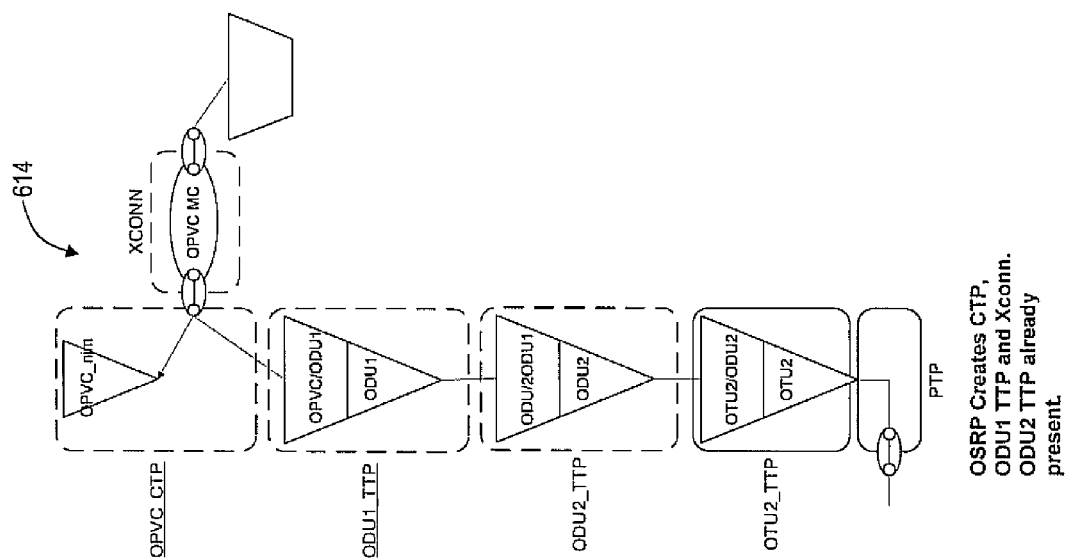

Referring to FIG. 11, a network 550 of optical cross connects (OCXs) 552a,552b,552c,552d illustrates an example of embedded SONET/SDH links 554 with OTN links 556 in accordance with the present invention. Each OXC 552 generally includes a switch matrix (SM) 570 connected to one or more line modules (LMs) 572. The connection can include an electrical, optical, etc. backplane, midplane, etc. The switch matrix 570 is configured to provide switching at an optical layer (wavelength) and/or electrical layer (SONET/SDH/OTN). The switch matrix 570 provides switching of connections between each of the one or more line modules 572. The line modules 572 can be configured to receive SONET/SDH, OTN, or the like. The line modules 572 can also be configured to perform processing and switching of SONET/SDH, OTN, or the like. In general, the OXCs 552 are configured to implement the present invention described herein. For example, the switch matrix 570 can include representation of the various OTN SNCs. The OXCs 552 can include management interfaces through external interfaces or SONET/SDH or OTN overhead.

A Designated Transit List (DTL) can support a DTL Traffic Type parameter, restricting links to either SONET/SDH or OTN. This allows checking at DTL and DTLSet to not allow mix and match of DTLs as well as during SNC provisioning. SONET/SDH DTLs allow the use of embedded SONET/SDH lines over ODUk/OTUk. Note that intermediate transparent nodes supporting OTN cross-connects do not terminate the SONET/SDH line, and are not considered part of a SONET/SDH DTL.

FIG. 11 illustrates an exemplary case where the SONET/SDH link (S1) 554 is embedded in the OTUk/ODUk lines 556. Adjacency for the OCx/STMn link 554 is between OXCs 552a⇆552d. Accordingly, OXC B is transparent for SONET/SDH link S1 554. Maintaining bundle diversity is not a requirement for SONET/SDH SNCs, where a SONET/SDH mesh network is carried over an OTN mesh network. The OXCx 552 can support all various DTL types and associated behavior for OTN SNCs include Working DTL, Hierarchical Protect DTL, Associated Hop Protect, Manual Switch to Protect, Pre-Computed Protect, Current Route DTL, and Home Route DTL.

Failure of an OTUk OSRP line 556 causes all SNCs on the supporting line to release and attempt restoration. The following OTUk faults shall fail the OTN OSRP line and initiate release messaging: OTUk-LOF (Loss of Frame), OTUk-AIS (Alarm Indication Signal), OTUk-LOS (Loss of Signal), OTUk-TIM (Trail Trace Identifier Mismatch), and OTUk-BDI (Backward Defect Indication). The system can support SNC Integrity Check (SNCIC) for OTN SNCs. Behavior of SNCIC is consistent with SONET/SDH SNCIC behavior.

The network 500 and the associated OXCs 552 can initiate mesh restoration for OTN SNCs upon SNCIC failure. The following defects detected at the origination and termination points (e.g., each OXC 552 with OTUk links 556) can fail SNCIC for ODUk SNCs: ODUk-AIS, ODUk-BDI, ODUk-OCI, and ODUk-LCK (Locked). Note that ODUk-LCK and ODUk-OCI path defects are not typically be present at SNC endpoints. It is possible that intermediate equipment could generate these defects. The following defects detected at the origination and termination points shall fail SNCIC for OPVC1-Xn SNCs: OPVC-AIS, OPVC-BDI, OPVC-OCI, and OPVC-LCK. Note that OPVC-LCK and OPVC-OCI path defects would not typically be present at SNC endpoints. It is possible that intermediate equipment could generate these defects.

When an OTN facility object is in dependency due to equipment failure, the OXC 552 can send a release for all SNCs on the facility object and initiate mesh restoration. A TM failure or reboot during cross-connect creation shall initiate a release for the supported OTN SNC. OTN SNCs can support Max Admin Weight as described in the OSRP. The Admin weight can be expanded to include separate cost and latency attributes. The OXCs 552 can support termination of OTN SNCs on a CTP or GTP supporting transparent interfaces; i.e. a CTP or GTP that belongs to an OCG supporting a CBR_TTP.

Referring to FIGS. 12 through 19, OTN OSRP object creation and deletion is illustrated in accordance with the present invention. OTN OSRP can be capable of creating the following types of cross-connects for the corresponding SNC: ODU2Xcon, ODU1Xcon, and OPVCXcon. Once an available line is selected, the system can create the line side facility objects to support the SNC. In the simplest case, a CTP and cross-connect is created on a pre-provisioned TTP. More complex cases require creation of TTP supporting objects. Drop side TTP objects are always manually created.

The OXC can support both manually created and auto-created TTPs and/or CTPs on the same ODUk TTP interface. The OXC can also support both manually created PVC cross-connects and auto created OSRP cross-connects on the same OTUk. In order to support an ODU2 SNC, the OXC can be capable of auto creating an ODU2 CTP on an idle, enabled OTU2 TTP, as illustrated in an ODU2 SNC line side interface 600 in FIG. 12.

The OXC can be capable of auto creating the following line side interfaces to support ODU1 SNCs: ODU1 CTP created on an OTU1 TTP that is idle, but operationally enabled, as illustrated in an ODU1 SNC line side interface on an OTU1 602 in FIG. 13; ODU1 CTP created on an ODU2 TTP that is not busy (i.e., has open timeslots) and is operationally enabled, as illustrated in an ODU1 SNC line side interface on an ODU2 in FIG. 14; ODU1 CTP and ODU2 TTP created on an OTU2 TTP that is idle, but operationally enabled, as illustrated in an ODU1 SNC line side interface on an OTU2 in FIG. 15.

The OXC shall be capable of auto creating the following line side interfaces to support OPVC1-Xn SNCs: OPVC CTP and ODU1 TTP created on an OTU1 TTP that is idle, but operationally enabled, as illustrated by an OPVC SNC line side interface on an OTU1 608 in FIG. 16; OPVC CTP created on an ODU1/ODU2 TTP that is not busy (i.e., has open timeslots) and is operationally enabled, as illustrated by OPVC SNC line side interfaces on ODU1/ODU2 610,612 in FIG. 17; OPVC CTP and ODU1 TTP created on an ODU2 TTP that is not busy (i.e., has open timeslots) and is operationally enabled, as illustrated on an OPVC SNC line side interface on an ODU2 614 in FIG. 18; and OPVC CTP, ODU1 TTP, and ODU TTP created on an ODU2 TTP that is idle, but operationally enabled, as illustrated on an OPVC SNC line side interface 616 in FIG. 19.

ODUk TTPs that are auto-created by OSRP are created with the appropriate payload type code in order to support the child TTP or CTP objects. Payload type codes for auto-created TTPs are read-only. With the exception of payload type, ODUk TTPs that are auto-created by OSRP are created with the MO default values. In order to meet mesh restoration performance requirements the system prioritizes establishment of the data-path. This may occur prior to presenting the TP object attributes to the management interface. The system allows creation of manually provisioned cross-connects on TTPs created by OSRP. The system can auto-delete TTPs created by OSRP after the TTP has been idle for 1 second. An idle TTP is defined as a TTP that does not support any higher layer termination or connection.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A method for hierarchical mesh restorations of connections in an Automatically Switched Optical Network, comprising:
receiving a request to create a Virtual Sub Network Connection, wherein the Virtual Sub Network Connection comprises a defined payload type, wherein the Virtual Sub Network Connection comprises an Optical Transport Network (OTN) Sub Network Connection carrying a combination of OTN, Synchronous Optical Network (SONET), and Synchronous Digital Hierarchy (SDH) signals such that OTN, SONET, and SDH signals each participate in a same mesh restoration scheme at an OTN, SONET, and SDH layer, and wherein SONET and SDH bandwidth is only defined at origination and termination points of the Virtual Sub Network Connection whereas OTN bandwidth is defined at each point of the Virtual Sub Network Connection;
creating an originating Virtual Connection Point at an originating node;
creating a terminating Virtual Connection Point at a terminating node;
mapping the defined payload type to the originating Virtual Connection Point and the terminating Virtual Connection Point;
responsive to a failure, performing mesh restoration in a hierarchical manner, wherein the hierarchical manner comprises:
a) attempting to mesh restore the Virtual Sub Network Connection; and
b) if unable to mesh restore the Virtual Sub Network Connection, splintering the Virtual Sub Network Connection into individual connections and restoring the individual connections by performing one of standard mesh restoration and Local Span Mesh Restoration of individual Sub Network Connections within the Virtual Sub Network Connection.

2. The method of claim 1, further comprising:
creating an Optical Data Unit Trail Termination Point through an Optical Transport Network signal and routing protocol.

3. The method of claim 2, further comprising:
auto-creating a SONET/SDH Trail Termination responsive to creating the Optical Data Unit Trail Termination Point.

4. The method of claim 3, further comprising:
creating a SONET/SDH Connection Termination Point through a SONET/SDH signal and routing protocol; and
creating cross connects in a switch matrix.

5. The method of claim 2, further comprising:
advertising available bandwidth in terms of Optical Transport Network bandwidth.

6. The method of claim 1, wherein the method is performed by an optical switch comprising:
one or more line modules; and
a switch matrix interconnecting each of the one or more line modules, wherein the switch matrix is configured to switch at each of Optical Transport Network, SONET, SDH layers;
wherein the switch matrix is configured to operate responsive to an Optical Transport Network signal and routing protocol and a SONET/SDH signal and routing protocol.

7. An optical switch, comprising:
one or more line modules, wherein the one or more line modules are configured to terminate each of Optical Transport Network, SONET, or SDH;
a switch matrix interconnecting each of the one or more line modules;
wherein the switch matrix is configured to operate responsive to an Optical Transport Network signal and routing protocol or a SONET/SDH signal and routing protocol;
wherein the Optical Transport Network signal and routing protocol is configured to provide restoration of Optical Data Unit and Optical Channel Payload Virtual Container Sub Network Connections;
wherein, responsive to a failure, mesh restoration is performed in a hierarchical manner comprising:
a) attempting to mesh restore the Optical Data Unit and Optical Channel Payload Virtual Container Sub Network Connections; and
b) if unable to mesh restore the Optical Data Unit and Optical Channel Payload Virtual Container Sub Network Connections, splintering the individual Sub Network Connections within the Optical Data Unit and Optical Channel Payload Virtual Container Sub Network Connections into individual connections and restoring the individual connections through one of standard mesh restoration and Local Span Mesh restoration;
wherein the Optical Data Unit and Optical Channel Payload Virtual Container Sub Network Connections comprise an Optical Transport Network (OTN) Sub Network Connection carrying a combination of OTN, Synchronous Optical Network (SONET), and Synchronous Digital Hierarchy (SDH) signals such that OTN, SONET, and SDH signals each participate in a same mesh restoration scheme at an OTN, SONET, and SDH layer, and wherein SONET and SDH bandwidth is only defined at origination and termination points of the Virtual Sub Network Connection whereas OTN bandwidth is defined at each point of the Virtual Sub Network Connection.

8. The optical switch of claim 7, wherein the one or more line modules are configured to terminate each of Optical Transport Network, SONET, and SDH; and
wherein the switch matrix is configured to switch at each of Optical Transport Network, SONET, and SDH layers.

9. The optical switch of claim 7, further comprising:
one or more Optical Data Unit Sub Network Connections each terminated on a Virtual Trail Termination Point.

10. The optical switch of claim 7, further comprising:
an Optical Transport Unit Trail Termination Point terminating a physical Optical Transport Network signal to an Optical Channel Data Unit signal;
an Optical Data Unit Trail Termination Point terminating the Optical Channel Data Unit signal to a Synchronous Transport Module signal; and
a Synchronous Transport Module Trail Termination Point terminating the Optical Channel Data Unit signal to a plurality of Administrative Units connected to a plurality of Connection Termination Points in the switch matrix.

11. The optical switch of claim 10, further comprising:
a Virtual Trail Termination Point configured to logically terminate Synchronous Transport Module and Optical Channel Data Unit trails.

12. The optical switch of claim 11, wherein the Optical Transport Network signal and routing protocol is configured to create the Optical Data Unit Trail Termination Point and the Synchronous Transport Module Trail Termination Point; and wherein the SONET/SDH signal and routing protocol is configured to create the Synchronous Transport Module Trail Termination Point and cross connects in the switch matrix.

13. The optical switch of claim 7, wherein the restoration comprises:
   mesh restoring a plurality of Optical Transport Network Sub Network Connections between Virtual Connection Points on physical interfaces on the one or more line modules; and
   if unable to restore the plurality of Optical Transport Network Sub Network Connections, performing one of standard mesh restoration and Local Span Mesh Restoration.

14. An Automatically Switched Optical Network, comprising:
   a plurality of interconnected nodes;
   an Optical Transport Network signal and routing protocol communicating to each of the plurality of nodes; and
   a SONET/SDH signal and routing protocol communicating to each of the plurality of nodes;
   wherein the Optical Transport Network signal and routing protocol is configured to provide restoration of Optical Data Unit and Optical Channel Payload Virtual Container Sub Network Connections;
   wherein, responsive to a failure, mesh restoration is performed in a hierarchical manner comprising:
   a) attempting to mesh restore the Optical Data Unit and Optical Channel Payload Virtual Container Sub Network Connections; and
   b) if unable to mesh restore the Optical Data Unit and Optical Channel Payload Virtual Container Sub Network Connections, splintering the individual Sub Network Connections within the Optical Data Unit and Optical Channel Payload Virtual Container Sub Network Connections into individual connections and restoring the individual connections through one of standard mesh restoration-and Local Span Mesh restoration;
   wherein the Optical Data Unit and Optical Channel Payload Virtual Container Sub Network Connections comprise an Optical Transport Network (OTN) Sub Network Connection carrying a combination of OTN, Synchronous Optical Network (SONET), and Synchronous Digital Hierarchy (SDH) signals such that OTN, SONET, and SDH signals each participate in a same mesh restoration scheme at an OTN, SONET, and SDH layer, and wherein SONET and SDH bandwidth is only defined at origination and termination points of the Virtual Sub Network Connection whereas OTN bandwidth is defined at each point of the Virtual Sub Network Connection.

15. The Automatically Switched Optical Network of claim 14, wherein the Optical Transport Network signal and routing protocol communicates to each of the plurality of nodes through a General Communication Channel; and
   wherein the SONET/SDH signal and routing protocol communicates to each of the plurality of nodes through a Data Communication Channel.

16. The Automatically Switched Optical Network of claim 15, wherein the General Communication Channel advertises Optical Transport Network bandwidth and the Data Communication Channel advertises SONET/SDH bandwidth.

17. The Automatically Switched Optical Network of claim 14, wherein the restoration comprises:
   mesh restoring a plurality of Optical Transport Network Sub Network Connections between Virtual Connection Points on physical interfaces; and
   if unable to restore the plurality of Optical Transport Network Sub Network Connections, performing one of standard mesh restoration and Local Span Mesh Restoration.

* * * * *